United States Patent [19]
Mohajer

[11] 3,839,284
[45] Oct. 1, 1974

[54] POLYURETHANES PREPARED FROM 2,3,5,6-TETRAMETHYL-P-XYLYLENE DIISOCYANATE

[75] Inventor: Ali Akbar Mohajer, Pontypool, England

[73] Assignee: Imperial Chemical Industries Limited, London, England

[22] Filed: July 2, 1973

[21] Appl. No.: 375,911

Related U.S. Application Data

[63] Continuation-in-part of Ser. No. 160,888, July 8, 1971, abandoned, which is a continuation of Ser. No. 749,998, Aug. 5, 1968, abandoned.

[30] Foreign Application Priority Data
Aug. 11, 1967 Great Britain................... 37030/67

[52] U.S. Cl. ...... 260/47 CB, 57/140 R, 260/75 NP, 260/77.5 AP, 260/77.5 SP, 260/453 A
[51] Int. Cl............................................ C08g 22/04
[58] Field of Search.... 260/47 CB, 75 NP, 77.5 AP, 260/77.5 SP, 453 A, 453 AL; 57/140 R

[56] References Cited
UNITED STATES PATENTS
| | | | |
|---|---|---|---|
| 2,873,299 | 2/1959 | Mikeska............................. | 260/651 |
| 2,929,800 | 3/1960 | Hill.................................... | 260/77.5 |
| 3,357,954 | 12/1967 | Kirkaldy............................. | 260/75 |

*Primary Examiner*—Lester L. Lee
*Attorney, Agent, or Firm*—Cushman, Darby & Cushman

[57] ABSTRACT

Disclosure of preparation of novel diisocyanates and polyurethanes (particularly polyester- and polyether-urethane elastomers) prepared therefrom.

4 Claims, No Drawings

POLYURETHANES PREPARED FROM 2,3,5,6-TETRAMETHYL-P-XYLYLENE DIISOCYANATE

The present application is a continuation-in-part of Ser. No. 160,888 filed July 8, 1971, now abandoned, which is in turn a continuation of Ser. No. 749,998 filed Aug. 5, 1968, now abandoned.

The present invention relates to novel diisocyanates and to synthetic polymers produced therefrom as well as to filaments, yarns, films and the like produced from said polymers. It relates particularly to polyester- and polyether-urethane segmented elastomeric polymers such as are capable of being melt spun and which are produced from said novel diisocyanates.

The preparation of urethane polymers using diisocyanates has been widely described in the technical and patent literature.

The use of compounds of the form para- $OCN-(CH_2)_n R(CH_2)_n NCO$, where R is a benzene ring, has been disclosed for this purpose, the advantage of using such compounds containing $(CH_2)_n$ groups between the NCO group and the benzene ring being that the polymers derived therefrom have enhanced resistance to light and to discoloration by a chlorite bleach such as is used for bleaching textile yarns and fabrics.

In practice, however, Applicants have found that while such compounds, when used with care, produce very good products, they tend to have high reactivity and, unless polymerization conditions are very carefully controlled, the reaction may easily proceed to give an intractable gelled product. This is especially the case when using melt-polymerization.

Applicants have now found that the introduction of alkyl substituents, and particularly of methyl groups, into the benzene ring of compounds of the class para—$OCN(CH_2)_n R(CH_2)_n CNO$, where n = 1 to 3 and R represents a benzene ring, lowers the reactivity of said compounds to a point where polymerization becomes more easily manageable.

In order for the polymeric products to have a suitably high melting point it is preferable that said alkyl substituents be located symmetrically on the benzene ring. Preferably the ring should be fully substituted. By symmetrical location we mean that there must be two or four said alkyl substituents on the benzene ring of the diisocyanate, all such substituents being the same, for instance methyl or ethyl groups, and the members of any pair being located in para positions one to the other. In the case of a fully substituted benzene ring the adjacent ortho-positioned alkyl substituents may be linked together to form a ring, such as a cyclo-tetra methylene ring.

Of course, the hydrogen atoms of the $(CH_2)$ groups between the benzene ring and the NCO group may be substituted as well, preferably symmetrically and preferably with methyl groups.

Polymers produced from said compounds having alkyl substituents on the ring exhibit enhanced colour and strength retention after exposure to chlorite-bleach and to light, as compared with polymers produced from compounds without said alkyl substituents on the ring.

Polymers made from said compounds with all positions in the benzene ring substituted have the advantage of higher melting point. Furthermore elastomeric polymers made from such compounds have superior elastic properties.

Accordingly, the present invention in one of its aspects comprises novel diisocyanates of the class consisting of a benzene ring substituted with two identical — $(CQ_2)_n NCO$ groups at para positions one to the other on said ring, Q being hydrogen or an alkyl group containing between one and three carbon atoms, n being 1 to 3, one or two para-positioned pairs of the remaining hydrogen atoms of said ring being substituted by identical alkyl groups.

In another of its aspects the present invention comprises polymers made from diisocyanates of said class defined hereinbefore.

In a further aspect the present invention comprises spinnable polymers made from diisocyanates of said class and to filaments and the like spun therefrom.

Examples of such novel diisocyanates are as follows:

1. 2,5-Dimethyl p-xylylenediisocyanate
2. 2,3,5,6-Tetramethyl-p-xylylenediisocyanate
3. 2,2'-(2,5-dimethyl-p-phenylene)-bis(ethylisocyanate)
4. 2,2'-(2,3,5,6-tetramethyl-p-phenylene)-bis(ethylisocyanate)
5. 9,10-bis (isocyanato methyl)-1,2,3,4,5,6,7,8 octahydro anthracene
6. 9,10-bis (isocyanato ethyl)-1,2,3,4,5,6,7,8 octahydro anthracene Instead of methyl substituents, ethyl, propyl, or isopropyl groups may be used.

For the production of homopolymers, and co-polymers, that is, non-segmented polymers, the diisocyanates of the present invention can be reacted in suitable proportions with, for instance:

i. diols, such as
  a. Straight or branched chain aliphatic glycols with 2–12 carbon atoms, for example:
    Ethylene glycol
    Trimethylene glycol
    1,4-butane diol
  b. Cycloaliphatic glycols, for example:
    trans-cyclohexane 1,4-diol
    trans-cyclohexane 1,4-dimethanol
  c. Arylaliphatic diols, for example:
    p-xylene glycol
    2,3,5,6 tetramethyl-p-xylylene glycol
    p-bis($\beta$-hydroxyethoxy) benzene
ii. diamines such as
  a. Straight or branched chain aliphatic diamines with 2–12 carbon atoms, for example:
    Ethylene diamine,
    Tetramethylene diamine
    3 methyl hexamethylene diamine, etc.
    N,N' diisobutyl hexamethylene diamine
  b. Cyclic diamines, for example,
    Piperazine,
    2,5-dimethylpiperazine,
    2,3,5,6-tetramethyl piperazine
  c. Aromatic diamines, for example:
    m- or p- phenylene diamine,
    p,p'-diaminodiphenyl methane
iii. Hydrazine or dihydrazides
iv. Dithiols having structures analogous to those of the diols.

Of course, if required, suitable amounts of triols or tetrols may be substituted for part of said compounds.

For the production of elastomeric segmented copolymers one may react the novel diisocyanates in suitable proportions and in suitable manner, with diols, diamines, or dithiols and the following polymers:

i. Aliphatic polyesters or copolyesters

For the preparation of such compounds an aliphatic glycol or a mixture of glycols is reacted with one or more aliphatic dicarboxylic acids. An excess of glycol is used so that the (co)polyester produced has a predominance of —OH end groups. The glycols used can be for instance ethylene glycol, trimethylene glycol, propylene glycol, 1,4-butane diol or neopentylene glycol (2,2-dimethyl 1,3-propane diol). Dicarboxylic acids which may be used are, for example, succinic acid, glutaric acid, adipic acid, pimelic acid, suberic acid, azelaic acid or sebacic acid.

Examples of such copolyesters are poly(7/3 ethylene/neopentylene adipate) and poly(7/3 ethylene/propylene adipate).

ii. Aliphatic polyethers or copolyethers

For instance, poly(tetramethylene oxide) glycols or copoly(propylene oxide/tetramethylene oxide) glycol. The polyether based on tetrahydrofurane is the preferred polyether and this material may be obtained in molecular weights of 1,000–6,000 by polymerising tetrahydrofurane in the temperature range 0° to 40°C using catalysts such as fluorosulphonic acid. When the reaction is complete excess tetrahydrofurane is distilled off and the polymer washed to neutrality with boiling water to remove the catalyst. The polymer is then dried by azeotropic distillation with toluene. Copolyethers can be prepared by including in tetrahydrofurane the necessary amounts of other cyclic ethers, e.g., ethylene oxide, and propylene oxide.

It is preferred that the (co)polyethers or (co) polyesters should have molecular weights between 1,000 and 6,000 and particularly between 1,500 and 5,000 and that their glass transition temperature should be below room temperature. Furthermore, when making elastomeric polymers, unexpected and improved properties are achieved if one employs the following preferred reactants and molar proportions: (co)polyester or (co)-polyether $(1-x)$, diol x and diisocyanate 0.98 to 1.08, where $x/1 - x$ lies between 0.2 and 1. These unexpected and improved properties are decreased growth in air at room temperature, decreased growth in water at 60°C, higher elastic recovery and higher work recovery, as measured by the procedures described below. Of course, other proportions may be used in order to get different polymer properties.

While the present invention relates particularly to polyester- and polyether-urethanes, useful products may be obtained using polymers produced by a process wherein the end OH groups of the aforesaid (co)-polyethers are converted to —NH$_2$ groups by either of the following methods:

a. Reaction with thionyl chloride, followed by ammonia under pressure.
b. Reaction with acrylonitrile in the presence of a basic catalyst, followed by hydrogenation of the nitrile end groups.

A further class of polymers which can be used is comprised of the aliphatic N-alkylated polyamides.

Such polymers may be produced by polymerisation of an N-alkyl amino acid or of the salt of an N,N'-dialkyl diamine with a dicarboxylic acid. Examples are:

Poly(N-isobutyl undecanoamide) or
Poly(N,N'-diisobutyl hexamethylene sebacamide).

An excess of the diamine is used so that the end groups are predominantly —N(R)H groups. (R = e.g., isobutyl).

The diisocyanates of the present invention may be prepared from the corresponding diamines by either of the following methods:

a. By reaction of the carbamic acid derivative of the amine with phosgene in suitable solvents, e.g., o-dichlorobenzene.
b. By direct reaction of the diamine with a cold solution of excess phosgene in a solvent such as o-dichlorobenzene or toluene.

Of course, other known procedures may be employed for the preparation of said diisocyanates.

The preparation of diisocyanates of the present invention is illustrated by the following examples, which are in no way limitative.

EXAMPLE 1

Preparation of 2,5-Dimethyl-p-xylylene diisocyanate.

This diisocyanate was prepared from p-xylene by a three-stage process:

a. Acetamidomethylation of p-xylene

N,N'-diacetyl-2,5-dimethyl-p-xylylene diamine was prepared according to the method of Parris & Christenson (J. Org. Chem., 25, 1888 (1960)), with a yield of 58% and with m.p. 268°–270°.

Analysis: Found: C = 68.0%; H = 8.1%; N = 11.7%
Calculated for $C_{14}H_{20}N_2O_2$: C = 67.70%; H = 8.12%; N = 12.28%.

b. Hydrolysis of N,N'-diacetyl-2,5-dimethyl-p-xylylene diamine.

N,N'-diacetyl-2,5-dimethyl-p-xylylene diamine prepared as described above was hydrolysed with excess aqueous sodium hydroxide solution in an autoclave at 175°C (100 p.s.i.) for 24 hours. The solid diamine was extracted into hot xylene. The hot solution was filtered under nitrogen and the xylene distilled off under reduced pressure. Distillation of the residue gave 82% yield of 2,5-dimethyl-p-xylylene diamine, b.p. 170°–176°C (12 mm) m.p. 86°–86.5°C. Recrystallization of the diamine from benzene gave a product with m.p. 90°–90.5°C.

The dihydrochloride had the following analysis:
Found: C = 50.0%; H = 7.5%; N = 12.4%; Cl = 29.4%
Calculated for $C_{10}H_{18}N_2Cl_2$: C = 50.63%; H = 7.65%; N = 11.81%; Cl = 29.91%.

c. Phosgenation of 2,5-dimethyl-p-xylylene diamine

Into a 5 litre flange-neck reaction flask, fitted with a stirrer, a thermometer and distillation attachments, there was introduced a solution of 88 g 2,5-dimethyl-p-xylylene diamine in 2 litres of o-dichloro-benzene. Some 200 ml. of the solvent were distilled off to dry the system. The apparatus was then fitted with a bubbler and a cold finger. Dry $CO_2$ gas was passed through the stirred solution at 100°C for 2 hours followed by a further 2 hours at room temperature to ensure complete formation of the carbamic acid intermediate. The flask was cooled down to −10°C. While stirring, phosgene gas was bubbled in gradually to saturate the solution. The temperature was slowly raised over a period of 4 hours to 160°–180°C, with phosgene re-fluxing in the cold finger. A gentle stream of phosgene was maintained through the solution and the temperature kept at 180°C for about 8 hours, until all solids had dissolved and a dark brown clear solution obtained. The solution was freed from excess phosgene by the passage of dry nitrogen for half an hour at 160°–180°C. The solution was cooled and filtered under nitrogen. The solvent was distilled off under reduced pressure and the residue distilled at a high vacuum pump to give 111.3 g (96.3%) of 2,5-dimethyl-p-xylylene diisocyanate, b.p. 134° (0.005 mm) and m.p. 59°C; NCO Eq. Wt. = 107.95 (Theor. 108.1).

Analysis: Found: C = 65.9%; H = 5.55=N = 13.4%.
Calculated for $C_{12}H_{12}N_2O_2$: C = 66.64%; H = 5.60%; N = 12.9%.

EXAMPLE 2

Preparation of 2,3,5,6-Tetramethyl p-xylylene diisocyanate

This diisocyanate was prepared from durene by a three-stage process:

a. Acetamidomethylation of durene.

N,N'-diacetyl-2,3,5,6-tetramethyl-p-xylylene diamine was prepared according to the method of Parris & Christensen (*J. Org. Chem.*, 25, 1888 (1960)) with yields of up to 80% (based on durene) by using an excess of all other reagents to the extent of 10% above the quantities described in the literature. The product had a melting point above 300°C.

Analysis: Found: C = 69.9%; H = 8.6%; N = 9.9%.
Calculated for $C_{16}H_{24}N_2O_2$: C = 69.50%; H = 8.77%; N = 10.15%.

b. Hydrolysis of N,N'-diacetyl-2,3,5,6-tetramethyl-p-xylylene diamine

N,N'-diacetyl-2,3,5,6-tetramethyl-p-xylylene diamine (867 g) was charged to a rocking autoclave with sodium hydroxide (433 g) and water (2,700 ml.). The autoclave was purged with nitrogen and sealed. It was heated at 175°C. and 100 p.s.i. pressure for 24 hours. The autoclave was cooled and the contents removed. The diamine product separated as a solid cake. The diamine was extracted into hot xylene. The xylene solution was dried by azeotropic distillation. The hot solution was filtered off under nitrogen to give a clear solution. Xylene was distilled off under reduced pressure followed by the distillation of the diamine b.p. 182°–195° (10 mm Hg.). Crude yield = 548 g (91% theoretical). The crude diamine was redistilled using a short Vigreux column to give 2,3,5,6-tetramethyl-p-xylylene diamine with a purity of 99.5%, b.p. 182°–186°C (8 mm) and m.p. 120°–121°C. Amine dihydrochloride Analysis:
Found: C = 54.6%; H = 8.4%; N = 10.6%; Cl = 25.1%.

Calculated for $C_{12}H_{22}N_2Cl_2$: C = 54.30%; H = 8.34%; N = 10.56%; Cl = 26.8%.

c. Phosgenation of 2,3,5,6-tetramethyl p-xylylene diamine

In a 10 litre flange-neck reaction flask, fitted with a stirrer, thermometer and distillation attachments was placed 8 litres of o-dichlorobenzene. About one litre of the solvent was distilled off to remove any trace of moisture. Then about 4 litres was distilled under reduced pressure onto freshly fractionated 2,3,5,6-tetramethyl-p-xylylene diamine (289.5 g). The diamine dissolved on warming. To the flange-neck flask, now containing about 3 litres of o-dichlorobenzene, was fitted a bubbler and a reflux condenser, cooled by circulating refrigerated ethylene glycol/methylated spirit. The flask was cooled down to −10°C. About 600 ml. phosgene (100% excess) was bubbled into the cooled and stirred o-dichlorobenzene. The warm diamine solution was introduced with stirring into this cold phosgene solution over a period of about 2 hours, while keeping the temperature near 0°C. The reaction mass became very viscous. It was gradually warmed up to 150°C over a period of 6 hours. During this period the viscous mass gradually dissolved and the colour of the solution turned light brown. Phosgene, distilled out of the reaction, was bubbled back at a slow rate through the reacting mixture to maintain a gentle reflux. Finally, when the solution became clear, the excess phosgene was removed by bubbling dry nitrogen through the solution over a period of 20 minutes at 130°–140°C. Dry charcoal was added and stirred at 120°C. for 15 minutes. It was filtered under nitrogen through a pad of Kioselguhr. Dichlorobenzene was distilled off under reduced pressure giving a crude yield of 480 g. (97% theoretical) of 2,3,5,6-tetramethyl-p-xylylene diisocyanate. The diisocyanate was recrystallised from 1,2-dichloroethane/petroleum ether (60° – 80°) to give a product with m.p. 157.5° – 158°C.

Analysis: Found: C = 68.1%; H = 6.8%; N = 11.7%.
Calculated for: $C_{14}H_{16}N_2O_2$: C = 68.80%; H = 6.60%; N = 11.45%.

EXAMPLE 3

Preparation of 2,2'-(2,5-Dimethyl-p-phenylene)bis-(ethylisocyanate)

This diisocyanate was prepared by the following stages:

a. Preparation of 2,2'-(2,5-dimethyl-p-phenylene)-bis(ethylamine)

The diamine was prepared by the series of reactions as described in B.P. 825,096.

The diamine was distilled under reduced pressure, b.p. 155°C. (6 mm), and solidified on standing at room temperature, m.p. 40°C. Amine dihydrochloride analysis:
Found: C = 54.7%; H = 8.6%; N = 9.2%; Cl = 24.9%.

Calculated for $C_{12}H_{22}N_2Cl_2$: C = 54.30%; H = 8.34%; N = 10.54%; Cl = 26.8%.

b. Phosgenation of 2,2'(2,5-dimethyl-p-phenylene)-bis(ethylamine)

The above diamine (225 g) was phosgenated according to the method used in Example 1 (Stage C) to give a yield of 269.4 g. (94.2% theoretical) of the crude diisocyanates b.p. 160°–170° (0.05 − 0.1 mm Hg.) The diisocyanate was purified by recrystallisation from dry methylene chloride/petroleum ether (60° − 80°) to give a crystalline product m.p. 71.5°–72.5°C. NCO Eq. Wt. = 123.35 (theoretical 122.13).

Analysis: Found: C = 68.7%; H = 6.9%; N = 10.9%.
Calculated for $C_{14}H_{16}N_2O_2$: C = 68.80%; H = 6.60%; N = 11.45%.

EXAMPLE 4

Preparation of 2,2'-(2,3,5,6-tetramethyl-p-phenylene)-bis (ethyl isocyanate)

This diisocyanate was prepared from durene by the following 4-stage process:

a. Preparation of bis(chloromethyl)durene

In a 5 litre reaction flask equipped with an efficient stirrer gas bubbler, thermometer and a condenser, were placed paraformaldehyde (330 g), dioxane (1,100 ml) and concentrated hydrochloric acid (1,300 ml). The mixture was stirred for 3 hours, while passing dry HCl gas, with gentle heating on a steam bath, until a clear saturated solution (with regard to HCl) was obtained. Durene (268 g) was then added and the chloromethylation carried out at 80° – 90°C for 24 hours, a slow stream of HCl gas bubbling through the reaction mixture continuously. Bis-(chloromethyl)durene was formed as a white solid mass which was filtered and washed in cold water and dried to constant weight in a vacuum oven at 40° – 50°C. Crude yield: 440.5 g (95.4% theoretical). The crude product was recrystallized from benzene to give pure bis(chloromethyl)durene, m.p. 196° – 197°C.

Analysis: Found: C = 2%; H = 7.1%; H = 30.0%. %. Calculated for $C_{12}H_{16}Cl_2$: C = 62.34%; H = 6.98%; Cl = 30.68%.

b. Preparation of bis(Cyanomethyl)durene

In a 5 litre flange-neck reaction flask, fitted with a stirrer, thermometer and reflux condenser, were placed sodium cyanide eggs (316 g) and distilled water (790 ml) and heated on a steam bath to dissolve the cyanide. Dioxane (3160 ml) and potassium iodide (7.9 g) were added and the temperature kept at 70° – 80°C. Bis(chloromethyl)durene (365g) was added in portions over a period of 1½ hours so that the temperature did not rise about 85°C. When the addition was complete the temperature was kept at 85° – 95°C and the mixture stirred for 10 hours. The mixture was cooled and added to chilled distilled water (2,600 ml), in which the product precipitated out. This was filtered, stirred once again in cold water, filtered and dried to constant weight. Crude yield: 316.5 g (94.5% theoretical). The crude product was recrystallised from alcohol to give pure bis(cyanomethyl)durene, m.p. 267° – 268°C.

Analysis: Found: C = 7.9%; N = 13.2%. Calculated for $C_{14}H_{16}N_2$: C = 79.20%; H = 7.60%; N = 13.20% c. Preparation of bis($\beta$-aminoethyl)durene

Bis(cyanomethyl)durene (89 g) was hydrogenated in a 2 litre rocking autoclave in the presence of cobalt/Kieselguhr (10 g), anhydrous ammonia (65 g) in dioxane (500 ml). The hydrogenation was carried out at 135°C with a hydrogen pressure of 1,360 – 1,560 p.s.i. Several small runs of hydrogenation were carried out and the products combined. On removal of the catalyst and the solvent the diamine was distilled off under vacuum. B.p. 156°C (0.05 mm Hg.).

d. Phosgenation of bis ($\beta$-aminoethyl)durene

A 10 litre flange-neck flask was fitted with an efficient stirrer, a thermometer, reflux condenser and a phosgene bubble tube carrying on its head the Teflon-screw mixer assembly. About 1 litre of o-dichlorobenzene was pumped into the flask and heated to 140°C. Phosgene gas was fed through the bubbler and when a saturated solution was formed, phosgene began to reflux. The liquid phosgene returning from the refrigerated condenser was further cooled by passing through a second condenser (at −15°C) and fed to the top of the screw mixer. At a point about 2 inches below the phosgene entry the solution of the diamine (159.4 g) in 5 litre dry o-dichlorobenzene was fed to the screw mixer at such a rate as to ensure a phosgene/diamine molar ratio greater than 20 : 1. The diamine solution and the liquid phosgene were mixed together in the Teflon screw mixer driven by an air motor and the resulting carbamoyl chloride hydrochloride slurry pushed downward through the bubbler into the 10 litre flask, where at 140° – 160°C the decomposition of the intermediate was allowed to take place. HCl from this decomposition was absorbed in a caustic soda scrubber and the refluxing phosgene returned to the screw mixer. Fresh phosgene gas was added to the reaction flask from a cylinder to maintain the desired rate of flow in the screw mixer. When all the diamine solution had been pumped in, the lines and the screw mixer were rinsed with pure solvent. The solution in the flask was pale yellow and within ten minutes from the end of diamine addition was clear. The excess phosgene was driven out by bubbling dry nitrogen through the solution at 140°C for 1 hour. The solution was cooled and filtered under dry nitrogen. o-Dichlorobenzene was distilled off under reduced pressure and the residue brought to constant weight. Weight of crude diisocyanate: 198 g (100% theoretical). It was recrystallised from dry methylcyclohexane, decolorised with charcoal, to give pure 2,2'-(2,3,5,6-tetramethyl-p-phenylene)-bis (ethyl isocyanate) (or bis (isocyanatoethyl)durene). m.p. 143° – 145.5°C NCO Eq. wt. 136.2 (theoretical: 136.17)

Analysis: Found: C = 70.6%; H = 7.6%; N = 10.4%. Calculated for $C_{16}H_{20}N_2O_2$: C = 70.55%; H = 7.41%; N = 10.29%.

EXAMPLE 5

Preparation of 9,10-bis(isocyanatomethyl)-1,2,3,4,5,6,7,8-octahydroanthracene.

This diisocyanate was prepared from 1,2,3,4,5,6,7,8-octahydroanthracene by the following 3-stage process:

a. Acetamidomethylation of the octahydroanthracene

In a 5 litre flange-neck flask, fitted with an efficient stirrer, reflux condenser and thermometer, were placed paraformaldehyde (107 g), glacial acetic glacial (2,680 ml) and conc. sulphuric acid (220 ml). The mixture was stirred at room temperature until a fine suspension was obtained. Acetonitrile (159 g) was then added dropwise over a period of 20 minutes during which time temperature of the reacting mixture gradually rose to 44°C. The mixture was warmed to 60° – 70°C when a clear solution was obtained. Octahydreanthracene (250 g) was added and the mixture stirred on a steam bath at 85°C. Within 40 minutes after the addition of the hydrocarbon a precipitate began to form, and 4 minutes later the thick paste was difficult to stir. Reaction was allowed to continue for 3 hours. Then 1 litre of hot water was added which was just enough to dissolve the amido-sulphate intermediate. This solution was poured into 10 litres of hot water in which the product N,N'-diacetyl- 9,10-bis(aminomethyl)-octahydroanthracene precipitated. The finely divided white solid was filtered and washed in cold water three times by re-suspension until the washings were sulphate-free. The solid was dried to constant weight in a vacuum oven at 80°–90°C.

Yield: 405.4 g (92% theoretical) m.p. >290°C (decomp)

The crude diacetyl compound was hydrolysed as follows:

b. Hydrolysis of N,N'-diacetyl-9,10-bis(aminomethyl)-1,2,3,4,5,6,7,8-octahydroanthracene.

The bis-acetamide obtained above (405 g) was hydrolysed by heating with conc. hydrochloric acid (800 ml) and glacial acetic acid (1400 ml) for 48 hours at reflux. The acids were distilled off at water pump and the solid residue taken up in approximately 8 litres of boiling water to dissolve the diamine dihydrochloride and filtered to remove the unhydrolysed material (52 g). The diamine (9,10-bis(aminomethyl)-octahydroanthracene) dihydrochloride crystallised out of the aqueous solution after concentrating to half its original volume. Analysis of dihydrochloride Found: C = 58.6%; H = 8.3%; N = 8.2%; Cl = 22.3%.

Calculated for $C_{16}H_{26}N_2Cl_2$: C = 60.56%; H = 8.26%; N = 8.83%; Cl = 22.35%.

The free diamine was obtained by the addition of excess sodium hydroxide to the aqueous suspension of the diamine dihydrochloride and extraction of the diamine into hot toluene. On removal of toluene by distillation at reduced pressure the crude diamine was obtained in a yield of 131 g (50% theoretical based on the weight of diacetyl actually hydrolysed). The diamine was recrystallised from toluene to give pure 9,10-bis(aminomethyl)octohydreanthracene, m.p. 153° – 155°C.

c. Phosgenation of 9,10-bis(aminomethyl)octahydroanthracene

In a 5 litre flange-neck flask, fitted with an efficient stirrer, reflux condenser, phosgene bubbler and a thermometer, was placed dry toluene (1 litre). This was cooled to −20°C and into it was absorbed about 400 ml of liquid phosgene. A solution of 9,10-bis(aminomethyl)-octahydroanthracene (67 g) in toluene (1 litre) was added over a period of one hour to the stirred and cooled solution of phosgene. A thick precipitate of the carbamyl chloride hydrochloride was formed. It was heated, with phosgene refluxing in the refrigerated condenser, with the temperature rising from room to 90°C over a period of 1½ hours. The suspension dissolved and a clear reddish solution was obtained. About one-third of the solvent was distilled off with reaction flask at 110°C with a current of dry nitrogen bubbling through the solution to remove the last traces of phosgene. The remainder of the solvent was distilled off under reduced pressure and the residue brought to constant weight.

Yield of crude diisocyanate: 80.5 g (99.2% theoretical) The crude product was decolorised with charcoal in methyl cyclohexane and allowed to crystallise from this solvent in colourless prism-shaped crystals m.p. 142.5° – 143.5°C. NCO Eq. Wt. : 149.0 (theoretical: 148.18).

Analysis: Found: C = 72.8%; H = 6.8%; N = 9.4%.
Calculated for $C_{18}H_{20}N_2O_2$: C = 72.95%; H = 6.80%; N = 9.45%.

EXAMPLE 6

Preparation of 9,10-bis($\beta$-isocyanatoethyl)-1,2,3,4,5,6,7,8-octahydreanthracene This diisocyanate was prepared from 1,2,3,4,5,6,7,8-octahydroanthracene by the following 4-stage process:

a. Chloromethylation of octahydroanthracene.

In a 5 litre flange-neck flask, fitted with a stirrer, a bubbler, a reflux condenser and a thermometer were introduced paraformaldehyde (160 g), dioxane (740 ml) and concentrated hydrochloric acid (870 ml). The mixture was stirred on a steam bath for 1½ hours at 70°C, while dry HCl gas was passed through the mixture until the mixture became clear. Octahydroanthracene (250 g) was added, the temperature was raised to 80° – 90°C and the reaction maintained at this temperature with continuous stirring for 11 hours. The white powdery solid was filtered, washed with cold water and dried to constant weight. Crude Yield: 360 g (94.6% theoretical) Pure 9,10-bis(chloromethyl)-1,2,3,4,5,6,7,8-octahydroanthracene was obtained on recrystallisation of the crude product from benzene; melting point: 221.5° – 224°C.

Analysis: Found: C = 67.8%; H = 7.3%; Cl = 24.2%.
Calculated for $C_{16}H_{20}Cl_2$: C = 67.84%; H = 7.12%; Cl = 25.04% b. 9,10-bis(cyanomethyl)-1,2,3,4,5,6,7,8-octahydroanthracene

In a 2 litre 3-neck flask fitted with a stirrer and reflux condenser was placed 9,10-bis(chloromethyl)-octahydroanthracene (100 g) together with n-propyl alcohol (1 litre) and refluxed under nitrogen. A solution of sodium cyanide (55 g) and potassium iodide (1 g) in water (80 ml) was added and the suspension refluxed for 3 hours at 91°C. The mixture was cooled and filtered. The solid product was washed by stirring in distilled water twice until the washings were free from chloride ions. The solid was dried to constant weight. Crude yield 82.25 g (88.3% theoretical). 9,10-Bis(cyanomethyl)octahydroanthracene, purified by recrystallisation from methyl cellosolve (2-methoxyethanol), had a melting point of 307.5° – 309°C.

Analysis: Found: C = 81.9%; H = 7.6%; N = 10.3%.
Calculated for $C_{18}H_{20}N_2$: C = 81.78%; H = 7.62%; N = 10.60%.

c. 9,10-Bis($\beta$-aminoethyl)-1,2,3,4,5,6,7,8-octahydroanthracene

A 2 litre rocking autoclave was charged with 9,10-bis(cyanomethyl) octahydroanthracene (47 g), methyl cellosolve (600 ml) and Raney nickel ($W_2$) (10 ml). The autoclave was sealed and further charged with anhydrous ammonia (100 g) and hydrogen to a pressure of 1,420 p.s.i. at room temperature. The autoclave was agitated while the temperature was raised to 110°C and kept at this temperature for 8 hours. After cooling to room temperature the catalyst was filtered off, the solvent was distilled off under reduced pressure and the residue brought to constant weight. Crude yield: 47 g (97% theoretical) 9,10-Bis ($\beta$-aminoethyl)octahydroanthracene was purified by recrystallisation from methyl cyclohexane, melting point: 140.5° – 141.5°C.

Analysis:
Diamine dihydrochloride
Found: C = 62.2%; H = 8.6%; N = 7.7%; Cl = 20.4%.

Calculated for $C_{18}H_{30}N_2Cl_2$: C = 62.61%; H = 8.75%; N = 8.11% Cl = 20.53%.

d. Phosgenation of 9,10-bis($\beta$-aminoethyl)-1,2,3,4,5,6,7,8-octahydroanthracene.

The phosgenation of bis ($\beta$-aminoethyl) octahydroanthracene was carried out by a method analogous to that for bis(aminomethyl) octahydroanthracene (Example 5).

65.2 g of 9,10-bis($\beta$-aminoethyl) octahydroanthracene yielded 71 g (91.5% theoretical) of crude 9,10-bis ($\beta$-isocyanatoethyl)octahydroanthracene which was purified by recrystallisations from methylcyclohexane and toluene. The pure diisocyanate had a melting point of 114° – 115°C, and NCO Eq. Wt.: 164 (theoretical 162.2).

Analysis: Found: C = 74.2%; H = 7.6%; N = 8.6%
Calculated for $C_{20}H_{24}N_2O_2$: C = 74.06%; H = 7.45%; N = 8.64%.

The preparation and properties of polymers prepared using the novel diisocyanates of the present invention will be described hereinafter. The various tests applied to said polymers and products obtained therefrom will, however, first be described hereinbelow.

1. Inherent Viscosity

The inherent viscosity is defined as twice the natural logarithm of the viscosity at 25°C of a ½% weight/volume solution of the polyurethane in o-chlorophenol, divided by the viscosity of o-chlorophenol at the same temperature.

2. Vicat softening point

The Vicat softening points alluded to were determined using a penetrometer similar to the apparatus described by Edgar and Ellery at page 2368 of the Journal of the Chemical Society 1952. The graph of extent of penetration versus temperature is produced automatically.

3. Annealing

The yarn was wound on to a container without tension and the package heated for 30 minutes at 110°C. All yarn properties referred to in this specification (except ZST) were determined on this annealed yarn.

4. Zero Strength Temperature (ZST).

A loop of the elastomer, supporting a weight of approximately 0.1 gram per denier, is immersed in a liquid-paraffin bath at 100°C. The temperature is raised gradually until the yarn breaks completely. The temperature at break is referred to as the "Zero Strength Temperature" (ZST).

5. Tenacity

The breaking load of the filaments expressed in grams per denier.

6. Extensibility

By extensibility of the filaments is meant the length by which they can be extended before they break, expressed as a percentage of their original length.

7. Elastic recovery

The yarn is extended 100% on an Instron extensometer at a rate of 500% per minute and then returned at the same rate to zero extension. After 30 seconds the yarn is recycled. This procedure is repeated for a total of four cycles. The elastic recovery of the filaments is expressed by the fraction obtained by dividing the length by which the filaments are extended on the application of a stress thereto, into the length by which they contract on removal of the stress therefrom. The fraction is expressed as a percentage.

8. Work recovery

The yarn is extended as for the determination of elastic recovery. The work recovery of the filaments is expressed as the fraction obtained by dividing the energy or work expended in stretching the said filaments by applying a stress thereto into the energy or work recovered when the said filaments retract toward their original dimensions on release of the stress. The fraction is commonly expressed as a percentage.

9. Growth in water at 60°C

A loop of approximately 200 denier yarn is formed by clamping with a split lead shot, weighing 0.17 g, and the length determined while the lead shot is hanging freely. The loop is extended 100 % on a frame, which is then immersed in water at 60°C for 5 minutes. The loop is then removed from the frame and allowed to hang in air for 1 hour, after which its length is measured. The increase in length, expressed as a percentage of the original length, is referred to as the growth.

10. Growth in air from 200% extension.

A loop of yarn is formed by clamping with a split lead shot, the weight of which being 0.45 g for yarns of 150 – 210 denier.

The loop of yarn is suspended, while slightly tensioned by the lead weight, for 24 hours to relax. The length of the loop is then determined. The loop is stretched 200% and held at the extended length for 24 hours. It is then released and allowed to relax while supporting the lead weight. The length is determined after 1 minute and after 24 hours relaxation. The increase in length, as a percentage of its original length, is expressed as the growth in air from 200% extension.

11. Light resistance tests

The filaments are wound on a frame and exposed to light from a Xenon Arc for 100, 200 and 300 hours. The elastic properties and colour of the filaments are compared before and after the exposure.

12. Bleaching Resistance Test

The filaments are immersed for a period of 45 minutes in an aqueous solution containing 0.1% by weight of sodium chlorite and 0.5 cc per litre of glacial acetic acid maintained at 85°C. The colour of the filaments as well as their elastic properties are compared before and after the bleaching treatment.

The following non-limitative example illustrates the preparation of homopolymers by reacting the novel diisocyanates of the present invention with diols. Similar methods may be used with diamines and dithiols.

EXAMPLE 7

Preparation of homopolyurethanes

In each case the solution of the various diisocyanates shown in Table 1, (0.01 mole) in 25 ml. dry 80/20(v/v)-chlorobenzene/o-dichlorobenzene mixture, was added slowly over a period of 2 hours to a stirred and refluxing solution of the diol (0.01 mole) in 60 ml. of the same solvent mixture. The heating and stirring was continued for a further 2-hour period. The polymer formed was swollen by the solvent. The reaction mixture was cooled to room temperature and the solvent decanted. The swollen polymer was stirred and heated with 250 ml. petroleum ether (100° – 120°) for 1 hour and filtered. This washing process was repeated using 150 ml. petroleum ether (60° – 80°). The polyurethanes thus obtained were dried in a vacuum oven at 50°C to constant weight. The following Table 1 shows the optical melting points of the polyurethanes. The diisocyanate -tetramethyl-p-xylene the greatest degree of symmetry, i.e. 2,3,5,6,-tetramethyl-p-xylylene diisocyanate consistently gave the highest melting polyurethanes.

Table 1

Melting points (°C) of some new polyurethanes

| Diisocyanates<br>Diols | 2,5-Dimethyl-p-xylylene diisocyanate | 2,3,5,6-Tetramethyl-p-xylylene diisocyanate | 2,2'-(2,5-Dimethyl-p-phenylene)bis(ethylisocyanate) |
|---|---|---|---|
| 1,4-butane diol | 212° | 275° | 195° |
| trans-cyclohexane-1,4-dimethanol | 222° | 295° | 206° |
| trans-cyclohexane-1,4-diol | >300° | >300° | >300° |
| p-xylylene glycol | 256° | 300° | 224° |
| p-bis($\beta$-hydroxyethoxy)benzene | 238° | 292° | 195° |

EXAMPLE 8

Reaction of diisocyanates with diamines and dihydrazides

The solution of the diisocyanates (0.01 mole) in 100 ml. dry ethylene chloride was added over a period of one hour with vigorous stirring, to an ice-cold solution of the diamine or dihydrazide (0.01 mole) in 100 ml. water (alcohol, in the case of N,N'-diisobutyl hexamethylene diamine). When the addition was complete 200 ml. water was added and the organic solvent distilled off at water pump. The polymers were filtered off and washed with alcohol and dried in vacuum oven at 50° to constant weight. Table 2 shows the optical melting points of the polyureas derived from two of the novel diisocyanates of this invention with some common diamines and a dihydrazide.

Table 2

Melting Points (°C) of some new Polyureas

| Diisocyanates<br>Diamines or dihydrazide | 2,3,5,6-Tetramethyl-p-xylylene diisocyanate | 2,2'-(2,3,5,6-Tetramethyl-p-phenylene)-bis(ethylisocyanate) |
|---|---|---|
| Hexamethylenediamine | >300°(decomp.) | 270°(decomp.) |
| N,N'-diisobutyl-hexa-methylenediamine | >300°(decomp.) | 201° |
| Piperazine | >300°(decomp.) | 260°(decomp.) |
| Succinic dihydrazide | >300°(decomp.) | 143° |

By using suitable mixtures of diols, diamines or dithiols, of course, various desirable copolymers may be prepared in a similar manner.

The novel diisocyanates of the present invention may also be used in the preparation of segmented elastomeric polymers.

The general procedure for the preparation of segmented elastomeric polyester- or polyether-urethanes is as follows. The polyester or polether is first reacted at temperatures between 100° - 120°C for 2 hours with all the diisocyanate. A diol or dithiol may then be added in one portion and stirred vigorously. The temperature is then usually raised rapidly to about 190° –200°C and the polymer cured at this temperature for 2 hours. Such polymer may then be melt spun or dissolved in a suitable solvent and wet or dry spun.

In the case of segmented polyurethane/ureas, the isocyanate terminated soft segment is usually taken up in a suitable solvent at room temperature (for example N,N-dimethyl formamide, N,N-dimethyl-acetamide, dimethyl sulphoxide, tetra methylene sulphone and the like), a solution of a diamine in a suitable solvent is added and the reaction carried out at room temperature. The polymer produced may then be isolated by the removal of the solvent by any known method. Alternatively the viscous solution produced may be spun by the 'wet' or 'dry' method.

For the preparation of melt-spinnable elastomers the molar ratio of diol or dithiol to polyester or polyether is so chosen as to give a product with sufficiently high melting point but not so high as to require a melt spinning temperature greatly in excess of 200° – 220°C. The molar ratio of diol (or dithiol) to polyester (or polyether) for melt-spinnable compositions is usually within the range 0.25:1 to 1:1. The amount of diisocyanate is usually equal to the total molar quantities of the diol and polyester (or polyether) together. However, according to the requirements of each specific case the amount of diisocyanate employed may range from 95% to 110% of the theoretical amount required.

Reaction is preferably carried out under an inert atmosphere, e.g., nitrogen, to prevent oxidation of the polymer occurring. Efficient mechanical mixing of the reagents is essential to obtain homogeneous products giving good properties in the resulting fibres or films. The segmented polyurethanes of this invention, as has been mentioned hereinbefore, may be used in the form of solutions and spun into filaments by conventional dry or wet spinning methods. The solutions of the polyurethanes can also be cast into films. Textile filaments are preferably made by meltspinning in which case no solvent is required. In making these products, additives may be included such as pigments, delustrants, plasticisers or stabilisers.

Polyester- or polyether-urethanes of this invention possess a molecular weight corresponding to an inherent viscosity of from 0.5–2.0, preferably 0.8 to 1.4.

The preparation of segmented elastomers using the novel diisocyanates of the present invention is illustrated, in no way limitatively, by the following examples. Filaments such as described in the examples are usually submitted to treatment at high temperature before commercial use and so the properties shown were tested on yarns previously heated at 110°C for ½ hour.

EXAMPLE 9

70 parts of a hydroxy-terminated copolyester derived from ethylene and neopentylene glycols in a molar ratio 7:3 and adipic acid, and having a molecular weight of 2,870, were mixed with 10.34 parts of 2,5-dimethyl-p-xylylene diisocyanate. The apparatus was vacuum-purged with dry nitrogen and then, under an atmosphere of nitrogen, the mixture was heated for 1.5 hours at 120°C with continuous stirring. The mixture was cooled to 100°C and 4.83 parts of p-bis ($\beta$-hydroxyethoxy) benzene added. After vacuumpurging the mixture was stirred for 10 minutes without raising the temperature. The temperature was then rapidly raised to 190°C within about 10–15 minutes. After stirring for 3 minutes at this temperature the viscosity rose significantly and the stirrer was pulled out of the melt. The mixture was allowed to polymerise at 190°C for 2 hours under nitrogen. This polymer contained 28% (by weight) of copolyester soft segments.

On cooling, the resulting polyesterurethane had an inherent viscosity (I.V.) of 1.41 and a Vicat softening point of 146°C (range 112° – 182°C). It was melt-spun at 196° into 5 filaments of total denier 295. The 5-filament yarn had the following properties after annealing at 110°C.

| | |
|---|---|
| Tenacity (g/d.) | 0.58 |
| Extensibility (%) | 264 |
| Elastic recovery (%) from 100% extension (4 cycles) | 99,99,99,98.5 |
| Work recovery (%) from 100% extension (4 cycles) | 44,82,82,84 |
| Zero Strength Temperature | 166°C |
| Growth in water at 60°C | 7.7% |
| Growth in air from 200% extension for 24 hours:- | |
| (a) Relax 1 minute | 11.4% |
| (b) Relax 24 hours | 1.0% |

EXAMPLE 10

Example 9 was repeated except that instead of p-bis ($\beta$-hydroxyethoxy) benzene, 3.38 g p-xylylene glycol was used. The resulting polymer had 83.6% of copolyester soft segments. The polymer had an inherent viscosity of 1.72 and a Vicat softening point of 134°C (range: 97° – 197°C). It was melt-spun at 220°C into 5 filaments of total denier 205 and dusted with talcum powder. The yarn had the following properties:

| | |
|---|---|
| Z.S.T. | 167.5°C |
| Tenacity (g/d.) | 0.176 |
| Extensibility (%) | 738 |
| Elastic recovery (%) from 100% extension (4 cycles) | 96,97,97,97 |
| Work recovery (%) from 100% extension (4 cycles) | 48,84,86,86 |
| Growth in water at 60°C | 20.6% |
| Growth in air from 200% extension for 24 hours:- | |
| (a) Relax 1 min. | 26% |
| (b) Relax 24 hours. | 12% |

EXAMPLE 11

60 parts of a hydroxy-terminated copolyester as used in Example 9 but having a molecular weight of 1900 were mixed with 16.8 parts of 2,3,5,6-tetramethyl-p-xylylene diisocyanate. After vacuum purging with nitrogen the mixture was heated for 2 hours at 120°C with continuous stirring. The mixture was cooled to 98°C and 3.2 parts of 1,4-butane diol added. After vacuum purging the mixture was stirred vigorously for 5 minutes. The temperature was then raised rapidly to 190°C. After 45 minutes at this temperature the stirrer was pulled out of the melt and the mixture allowed to polymerise further at 190°C for 2 hours. The product contained 75% (W/W) of the copolyester as the soft segment.

The resulting polyesterurethane had an I.V. of 0.72 and a Vicat softening point of 173°C (range 144° – 201°C). It was melt-spun at 194°C and wound up at 200 f.m.p. The 5-filament yarn had a denier of 197.

The yarn properties were as follows:

| | |
|---|---|
| Z.S.T. | 179.5°C |
| Tenacity (g/d.) | 0.261 |
| Extensibility (%) | 568 |
| Elastic recovery (%) from 100% extension (4 cycles) | 94,97,97,97 |
| Work recovery (%) from 100% extension (4 cycles) | 23,75,80,80 |
| Growth in water at 60°C | 23% |
| Growth in air from 200% extension for 24 hours:- | |
| (a) Relax 1 Min. | 52% |
| (b) Relax 24 hours. | 27% |

EXAMPLE 12

56.7 parts of poly (7/3 ethylene/neopentylene adipate of M. Wt. 1914 were heated under nitrogen to 210°C in a small stainless steel reactor fitted with a helical stirrer. 2.72 parts of p-bis ($\beta$-hydroxyethoxy) benzene were added over a period of one minute, followed by 10.69 parts of 2,3,5,6-tetramethyl p-xylylene diisocyanate (1% excess) over three minutes. When the viscosity of the polymer had reached a maximum (10–15 minutes), it was extruded from a nozzle in the base of the reactor into cold water. This product, which contained 81% (W/W) of the copolyester as soft segment, had an inherent viscosity of 0.9, an NCO end value of 41 (equivs/$10^6$gm) and a Vicat softening point of 145°C.

After drying under vacuum at 70° it was melt spun at 219°C and wound up at 200 f.p.m. to give a yarn, denier 258, with the following properties:

| | |
|---|---|
| Z.S.T. | 204°C |
| Tenacity (g/d.) | 0.97 |
| Extensibility (%) | 448 |
| Stress at 100% extn. (g/d.) | 0.18 |
| Growth in water at 60°C | 15% |
| Growth in air from 200% extension for 24 hours:- | |
| (a) Relax 1 min. | 20% |
| (b) Relax 24 hours. | 6% |
| Boiling water shrinkage | 36% |
| Elastic recovery (%) from 100% extension | 95,97,97,97 |
| Work recovery (%) from 100% extension | 76,86,86,88 |
| NCO ends | 35 equivs.$10^6$g. |

EXAMPLE 13

70 parts of the copolyester of Example 9 were mixed with 12.2 parts of 2,3,5,6-tetramethyl p-xylene diisocyanate. The polymerisation was conducted according to the previous examples except that the diol used in the second stage was 2.11 parts of 1,4-butane diol. The resulting polyesterurethane contained 83% (W/W) of the copolyester as the soft segment. It had an I.V. of 1.04 and a Vicat softening point of 167°C (range 159° – 180°c). It was melt-spun at 214°C. and wound up at 200 f.p.m. to give a yarn with a denier of 306 and the following properties:-

| | |
|---|---|
| Z.S.T. | 179.5°C |
| Tenacity (g/d.) | 0.325 |
| Extensibility (%) | 612 |
| Elastic recovery (%) from 100% extension (4 cycles) | 98,98,98,98 |
| Work recovery (%) from 100% extension (4 cycles) | 55,87,88,88 |
| Growth in water at 60°C. | 15.6% |
| Growth in air from 200% extension for 24 hours:- | |
| (a) Relax 1 min. | 24% |
| (b) Relax 24 hours. | 9% |

EXAMPLE 14

70 parts of the copolyester of Example 9 were mixed with 9.15 parts of 2,3,5,6-tetramethyl-p-xylene diisocyanate. After the first stage of heating at 120°C/1.5 hrs. the mixture was cooled to 100°C. and 1.45 parts of trans-cyclohexane-1,4-diol added. After vacuum purging with nitrogen, the mixture was stirred at 96°C for 10 minutes. The temperature was then rapidly raised to 190°C and after 12 minutes at this temperature the polymer showed a significant increase in its viscosity. The stirrer was removed from the melt and the polymer cured at 190°C. for 2 hours. The resulting polyesterurethane contains 86.9% (W/W) of the copolyester as the soft segment. It had an I.V. of 1.05 and a Vicat softening point of 224°C. (range 139° – 258°C). It was melt-spun at 220° – 246°C. The yarn spun at 220°C. had a denier of 520 and the following properties:-

| | |
|---|---|
| Z.S.T. | 200°C |
| Tenacity (g/d.) | 0.450 |
| Extensibility (%) | 980 |
| Elastic recovery (%) from 100% extension (4 cycles) | 96,97,97,98 |
| Work recovery (%) from 100% extension (4 cycles) | 78,90,90,91 |
| Growth in water at 60°C. | 17% |
| Growth in air from 200% extension for 24 hours:- | |
| (a) Relax 1 min. | 29% |
| (b) Relax 24 hours | 14% |

EXAMPLE 15

Example 14 was repeated except that, instead of trans-cyclohexane-1,4-diol, 1.69 parts of p-xylene glycol was used in the second stage. The polyesterurethane thus obtained contained 86.6% (W/W) of the copolyester as the soft segment. It had an I.V. of 0.96 and a Vicat softening point of 196°C. (range 144° – 229°). It was melt spun at 218°C and wound up at 200 f.p.m. The yarn had a denier of 224 and the following properties:

| | |
|---|---|
| Z.S.T. | 190°C |
| Tenacity (g/d.) | 0.164 |
| Extensibility (%) | 539 |
| Elastic recovery (%) from 100% extension (4 cycles) | 97,98,98,98 |
| Work recovery (%) from 100% extension (4 cycles) | 77,88,88,88 |
| Growth in water at 60°C. | 12.5% |
| Growth in air from 20% extension for 24 hours:- | |
| (a) Relax 1 min. | 34% |
| (b) Relax 24 hours | 15% |

EXAMPLE 16

70 parts of a hydroxy-terminated copolyester of Example 9, but having a molecular weight of 3712 were mixed with 8.3 parts of 2,3,5,6-tetramethyl-p-xylene diisocyanate and vacuum-purged with nitrogen. The mixture was stirred vigorously at 120°C for 1½ hours. It was then cooled to 90°C and 0.9 parts of ethylene glycol added and the mixture stirred for 5 minutes at this temperature when the viscosity appeared to increase. The temperature was rapidly raised to 190° over a period of 10 minutes. The stirring was continued at this temperature for 5 minutes while evacuating to free the melt from bubbles. The stirrer was pulled out of the melt and the melt cured at 190°C for 2 hours. The resulting polyesterurethane contains 88.4% (W/W) of the copolyester as the soft segment. It had an I.V. of 1.07 and a Vicat softening point of 162°C (range : 126° - 202°C). It was melt-spun at 208° C and wound up at 200 f.p.m. to give a yarn with a denier of 300 and the following properties:

| | | |
|---|---|---|
| Z.S.T. | | 196°C |
| Tenacity (g/d.) | | 0.302 |
| Extensibility (%) | | 479 |
| From 100% | (Elastic recovery (%) (4 cycles) | 95,97,97,97 |
| extension | (Work recovery (%) (4 cycles) | 52,83,85,86 |
| Growth in water at 60°C. | | 3.4% |
| Growth in air from 200% extension for 24 hours:- | | |
| (a) Relax 1 min. | | 24.6% |
| (b) Relax 24 hours | | 10.9% |

EXAMPLE 17

70 parts of a hydroxy-terminated copolyester of Example 9, but having a molecular weight of 1,940 were mixed with 11.0 parts of 2,3,5,6-tetramethyl-p-xylene diisocyanate and 1.75 parts of 2,3,5,6-tetramethyl-p-xylylene glycol. After vacuum-purging with nitrogen the mixture was stirred vigorously while the temperature was gradually raised to 120°C over a period of 30 minutes. At this point the melt appeared very viscous. The temperature was then raised rapidly to 190°C over a period of 8 minutes and the melt was cleared from bubbles by the application of vacuum for 5 minutes. The stirrer was pulled out of the melt and the melt cured at 190°C for 2 hours. The resulting polyesterurethane contains 84.5% (W/W) of the copolyester as the soft segment. It had an I.V. of 0.96 and a Vicat softening point of 189°C (range : 90° – 216°). It was melt-spun at 214°C to give a yarn with a Z.S.T. of 184°C and good mechanical and elastic properties.

EXAMPLE 18

70 parts of the copolyester of Example 9 (Mol. Wt. = 2870) were mixed with 12 parts of 2,3,5,6-tetramethyl-p-xylene diisocyanate and polymerisation carried out according to the previous examples except that the diol used in the second stage was 4.83 parts of p-bis(β-hydroxyethoxy) benzene (BHEB). The resulting polyesterurethane contained 80.6% (W/W) of the copolyester as the soft segment.

Properties of the polymer and the spinning conditions are given in Table 3 and the properties of the resulting yarns are shown in Table 4.

EXAMPLES 19 & 20

Example 12 were repeated except that the molar ratio of diol to copolyester was varied. The quantities of the reactants and the properties of the polyesterurethane obtained are shown in Table 3. Table 4 shows the corresponding yarn properties.

EXAMPLES 21, 22 & 23

Examples 18, 19 and 20 were repeated with the copolyester of Mol. Wt. 2,870 replaced by copolyester with molecular weight 3,712. The quantities of the reactants, the properties of the polyesterurethanes and the corresponding yarn properties are shown in Table 5.

Table 3

Polyesterurethanes based on Copolyester (Mol. Wt. 2870)

| Reactants and polymer properties | Example 18 | Example 19 | Example 20 |
| --- | --- | --- | --- |
| Copolyester, Parts | 70 | 70 | 70 |
| Diisocyanate, Parts | 12 | 10.7 | 9.16 |
| Diol, Parts | 4.83 | 3.60 | 2.42 |
| Copolyester Content % (W/W) | 80.6 | 83.0 | 85.8 |
| Diol/copolyester molar ratio | 1.0 | 0.75 | 0.50 |
| Inherent viscosity | 0.92 | 1.17 | 1.10 |
| Vicat softening point (°C) | 228° | 226° | 171° |
| (range) (°C) | (135° – 237°) | (150° – 230°) | (118° – 204°) |
| Melt Spinning temp. °C. | 228° | 205° – 209° | 204° |
| Wind-up speed (f.p.m.) | 200 | 100 – 200 | 200 |

Table 4

Yarn properties of polyesterurethanes of Table 3.

| Properties | Example 18 | Example 19 | Example 20 |
| --- | --- | --- | --- |
| Yarn I.V. | 0.91 | 0.97 | 1.08 |
| Denier | 266 | 228 | 274 |
| Z.S.T. °C | 200° | 197° | 189° |
| Tenacity (g/d.) | 0.249 | 0.325 | 0.304 |
| Extensibility (%) | 820 | 754 | 806 |
| Elastic recovery (%) from 100% extension (4 cycles) | 93, 96, 96, 96 | 98, 99, 99, 99 | 97, 99, 98, 98 |
| Work recovery (%) from 100% extension (4 cycles) | 40, 76, 79, 79 | 62, 84, 87, 88 | 57, 86, 86, 88 |
| Growth in water at 60°C | 13.0% | 10% | 8% |
| Growth in air from 200% extension for 24 hours:- | | | |
| Relax 1 min. | 30% | 22% | 23% |
| Relax 24 hrs. | 15% | 10% | 10% |

Table 5

Polyesterurethanes based on Copolyester (Mol. Wt. 3712)

| Reactant quantities polymer & Yarn Properties | Example 21 | Example 22 | Example 23 |
| --- | --- | --- | --- |
| Copolyester Parts | 70 | 70 | 70 |
| Diisocyanate, Parts | 9.45 | 8.25 | 7.10 |
| Diol, Parts | 3.72 | 2.81 | 1.90 |
| Copolyester content % (W/W) | 84.1 | 86.4 | 88.6 |
| Diol/copolyester molar ratio | 1.0 | 0.75 | 0.50 |
| Inherent viscosity | 1.05 | 1.00 | 0.97 |
| Vicat softening point (°C) | 250° | 224° | 163° |
| (range) | (226° – 262°) | (164° – 254°) | (107° – 194°) |
| Melt Spinning temp. (°C) | 249° | 243° | 214° |
| Wind-up speed (f.p.m.) | 50 | 100 | 200 |
| Yarn inherent viscosity | 1.07 | 1.13 | 1.28 |
| Denier | 684 | 373 | 300 |
| Z.S.T.°C | 200° | 199° – 200° | 193° |
| Tenacity (g/d.) | 0.220 | 0.195 | 0.460 |
| Extensibility (%) | 965 | 1055 | 586 |
| Elastic recovery (%) from 100% extension (4 cycles) | 95, 97, 97, 97 | 98, 98, 98, 98 | 99, 99, 98, 98 |
| Work recovery (%) from 100% extension (4 cycles) | 56, 86, 87, 87 | 70, 88, 89, 90 | 91, 93, 93.5, 93.5 |
| Growth in water at 60°C | 14% | 12.5% | 5.4% |
| Growth in air from 200% extension for 24 hours:- | | | |
| Relax 1 min. | 29.6% | 31.4% | 16% |
| Relax 24 hrs. | 16.6% | 16.4% | 6% |

EXAMPLE 24

70 parts of the copolyester of Example 9 were mixed with 11.76 parts of 2,2'-(2,5-dimethyl-p-phenylene)bis(ethyl isocyanate) and vacuum purged with dry nitrogen. The mixture was heated for 1.5 hours at 120°C. with continuous stirring. The temperature was lowered to 90°C and 4.86 parts of p-bis($\beta$-hyroxyethoxy) benzene added. After vacuum purging, the mixture was stirred for 5 minutes. The temperature was then raised rapidly to 190°C. over a period of 10 minutes. After 10 minutes stirring at this temperature the viscosity of the melt increased significantly. The stirrer was pulled out of the melt and the polymer cured at 190°C for 2 hours. The resulting polyesterurethane contained 80.8% (W/W) of the copolyester as the soft segment. The polyesterurethane which had a Vicat softening range of 82°–240°C. was melt-spun at 228°C. and wound up at 200 f.p.m. to give a slightly tacky yarn to which talcum powder was applied before winding up on a former. The annealed yarn had the following properties:

| | | |
|---|---|---|
| Denier | | 209 |
| Z.S.T. °C. | | 141° |
| Yarn I.V. | | 1.15 |
| Tenacity (g/d.) | | 0.13 |
| Extensibility (%) | | 721 |
| Recovery from 100% extension | E.R.% | 96,98,98,98 |
| (4 cycles) | W.R.% | 35,79,81,82 |
| Growth in water at 60°C. | | 22% |
| Growth in air from 200% extension for 24 hours:- | | |
| (a) Relax 1 min. | | 58% |
| (b) Relax 24 hours. | | 40% |

EXAMPLE 25

70 parts of a hydroxy-terminated copolyester as used in Example 9, but having a molecular weight of 1940 were mixed with 14.5 parts of 2,2'-(2,3,5,6-tetramethyl-p-phenylene)-bis(ethylisocyanate) and 3.58 parts of p-bis($\beta$-hydroxyethoxy) benzene. After vacuum purging with nitrogen the mixture was stirred vigorously while the temperature was raised to 114°C. over a period of 30 minutes. The mixture showed a significant rise in viscosity. The temperature was raised rapidly to 190°C over a period of 10 minutes. Vacuum was applied to clear the melt from bubbles. The stirrer was pulled out of the melt and the polymer cured at 190°C for 1¼ hours. The resulting polyesterurethane contains 79.5% (W/W) of the copolyester as the soft segment. It had an I.V. of 1.47 and a Vicat softening point of 145°C (range : 110° – 199°). It was melt-spun at 228°C and wound up at 200 ft. p.m. to give a yarn with a denier of 256 and the following properties:-

| | |
|---|---|
| Z.S.T. | 166°C |
| Tenacity (g/d.) | 0.281 |
| Extensibility (%) | 387 |
| From 100% extension: | |
| Elastic recovery (%) (4 cycles) | 96,97,97,97 |
| Work recovery (%) (4 cycles) | 67,77,79,81 |
| Growth in water at 60°C. | 17.8% |
| Growth in air from 20% extension for 24 hours:- | |
| (a) Relax 1 min. | 41.5% |
| (b) Relax 24 hrs. | 24.3% |

EXAMPLE 26

70 parts of a hydroxy-terminated copolyester of Example 21 – 23, having a molecular weight of 3,712, were mixed with 8.66 parts of 9,10-bis-(isocyanatomethyl)-1,2,3,4,5,6,7,8-octahydroanthracene and vacuum-purged with nitrogen. The mixture was heated at 100°C for 30 minutes with vigorous stirring. 1.87 parts of p-bis($\beta$-hydroxyethoxy) benzene were added and the mixture stirred vigorously for 10 minutes. The temperature was then raised rapidly to 190°C over a period of 10 minutes. It was stirred at this temperature for 10 minutes and evacuated to free from bubbles. The stirrer was pulled out of the melt and the melt cured at 190°C for 2 hours. The resulting polyesterurethane contained 86.9% (W/W) of the copolyester as the soft segment. It had an I.V. of 1.2 and a Vicat softening point of 135°C (range: 103° - 175°). It was melt spun at 220°C to give a yarn with a Z.S.T. of 200°C and good mechanical and elastic properties.

EXAMPLE 27

50 parts of a hydroxy-terminated copolyester of Example 25, having a molecular weight of 1940, were mixed with 12.52 parts of 9,10-bis-(isocyanatoethyl)1,2,3,4,5,6,7,8-octahydroanthracene and vacuum-purged with nitrogen. The mixture was vigorously stirred at 100°C for 50 minutes. 2.55 parts of p-bis($\beta$-hydroxyethoxy)benzene were added and the mixture stirred for 10 minutes. The temperature was raised to 190°C over a period of 10 minutes and the stirring continued at this temperature for 10 minutes while evacuating to free from bubbles. The stirrer was pulled out of the melt and the melt cured at 190°C for 2 hours. The resulting polyesterurethane contains 76.8% (W/W) of the copolyester as the soft segment. It has an I.V. of 0.87 and a Vicat softening of 182°C (range: 177° – 207°). It was melt spun at 196°C to give a yarn with Z.S.T. of 170°C and good elastic properties.

Examples 9 – 27 have dealt with polyester-urethanes alone, for the purpose of illustrating variations in preparation and properties. Polyetherurethanes also can be prepared using diisocyanates of the present invention and the following examples illustrate, non-limitatively, the preparations of such a polymer.

EXAMPLE 28

70 parts of a hydroxy-terminated polytetrahydrofuran having a molecular weight of 1996 and 11.83 parts of 2,3,5,6-tetramethyl-p-xylylene diisocyanate were reacted together. The apparatus was vacuum purged, heated at 120°C for 2 hours under nitrogen and then cooled to 90°C and 2.45 parts of p-bis($\beta$-hydroxyethoxy)benzene added. The mixture was stirred whilst raising the temperature rapidly to 190°C., the stirrer removed and the polymer cured at 190°C. for 2 hours under nitrogen.

After cooling the resultant polyetherurethane had an I.V. of 1.59 and a Vicat softening point of 176°C. It was melt-spun at 237°C. to give an elastomeric yarn with the following properties after annealing at 110°C.

| | |
|---|---|
| Denier | 93 |
| Z.S.T. (°C.) | 153°C |
| Tenacity (g/d.) | 0.32 |
| Extensibility (%) | 752 |
| Elastic recovery from 100% extension (4 cycles) | 94,94,94,95 |
| Work recovery from 100% extension (4 cycles) | 68,81,82,83 |
| Growth in water at 60°C. | 18.5% |
| Growth in air from 200% extension for 24 hours:- | |
| (a) Relax 1 min. | 46% |
| (b) Relax 24 hrs. | 21.1% |

EXAMPLE 29

The preparation was carried out as in the previous example using:

70 parts of polytetrahydrofuran of molecular weight 1996, 14.22 parts of 2,2'-(2,5 dimethyl-p-phenylene)-bis(ethylisocyanate) and 5.2 parts of p-bis ($\beta$-hydroxyethoxy)benzene.

The polymer was melt-spun at 250°C. giving elastomeric yarn with the following properties after annealing at 110°C.

| | |
|---|---|
| Denier | 325 |
| Z.S.T. °C. | 146°C |
| Tenacity (g/d.) | 0.26 |
| Extensibility (%) | 411 |
| Elastic recovery from 100% extension (4 cycles) | 94,96,96,96 |
| Work recovery from 100% extension (4 cycles) | 40,77,79,80 |
| Growth in water at 60°C. | 19.2% |
| Growth in air from 200% extension for 24 hours:- | |
| (a) Relax 1 min. | 34.1% |
| (b) Relax 24 hrs. | 22.4% |

The present invention comprises melt-spinning the above novel synthetic elastomers into filaments and also the filaments so obtained. The latter possess excellent elasticity and do not discolour when exposed over considerable periods to a Xenon arc or when bleached with sodium chlorite and tested in accordance with the light resistance and bleaching resistance tests defined herein. Such filaments like-wise possess good elastic recovery and good work recovery, frequently exhibiting an elastic recovery from 100% extension of at least 95%, and a work recovery from 100% extension of at least 75%.

Some examples of the polyurethanes described herein, particularly those based on 2,3,5,6-tetramethyl p-xylylene diisocyanate are distinguished from other synthetic elastomers by the ease with which they can be melt-spun into filaments which exhibit reduced tendency to stick together. They often have very high zero strength temperatures (Z.S.T.) for a melt-spun elastomer. Furthermore these novel polyurethane filaments are superior to known elastomeric filaments having similar physical properties in that they do not substantially discolour when submitted to the light and bleaching resistance tests herein defined. Such filaments are suitable for so-called foundation garments such as corsets, in elastic outerwear, for instance sweaters, ski-trousers, also in surgical elastic hosiery and bandages. other uses comprise woven or knitted swimwear, hosiery, brassieres and pyjamas. The filaments of the present inventions are likewise adapted for widespread application in the form of staple fibres, especially when blended with e.g., wool, cotton, polyamides etc. The novel elastomeric polyurethane filaments of this invention may be fabricated into composite elastic yarns by introducing them as continuous filaments together with one or more rovings of staple fibres e.g., poly(ethylene terephthalate), wool or cotton fibres into a conventional spinning or drafting frame. Yarns containing said elastomers can be used in making non-woven fabrics or may be blended with wool, for weaving cloth suitable for men's suits.

What is claimed is:

1. A segmented polyester- or polyether-urethane prepared from reaction between the following reactants: the hydroxy-ended (co)polyester or (co)polyether having a molecular weight in the range 1,500 to 5,000 and a glass transition temperature below room temperature, 2,3,5,6-tetramethyl p-xylylene-diisocyanate and of one of the diols: p-bis($\beta$-hydroxyethoxy) benzene, ethylene glycol, 2,3,5,6-tetramethyl p-xylylene glycols or transcyclohexane 1,4 diol, the molar proportions of said reactants lying in the range (Co)polyester or (co) polyether (1—x) Diol x 2,3,5,6-tetramethyl p-xylylenediisocyanate 0.98 to 1.08, where x/1—x lies in the range 0.2 to 1.

2. Filaments produced from polymers as claimed in claim 1.

3. Yarns produced from polymers as claimed in claim 1.

4. Films produced from polymers as claimed in claim 1.

* * * * *